July 4, 1944.  G. E. FORD  2,352,830
SIGNAL MECHANISM
Filed July 15, 1942
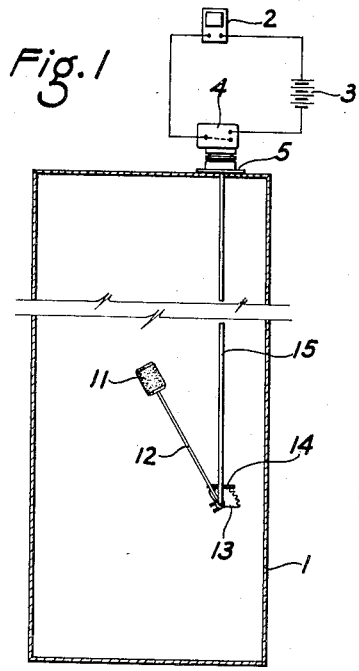
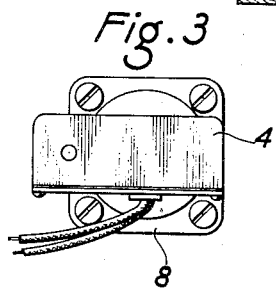
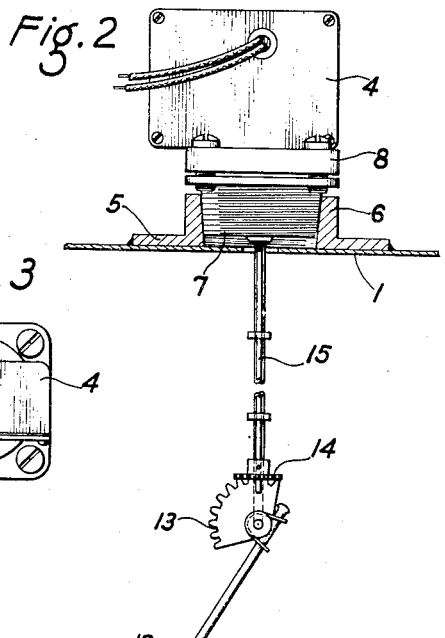
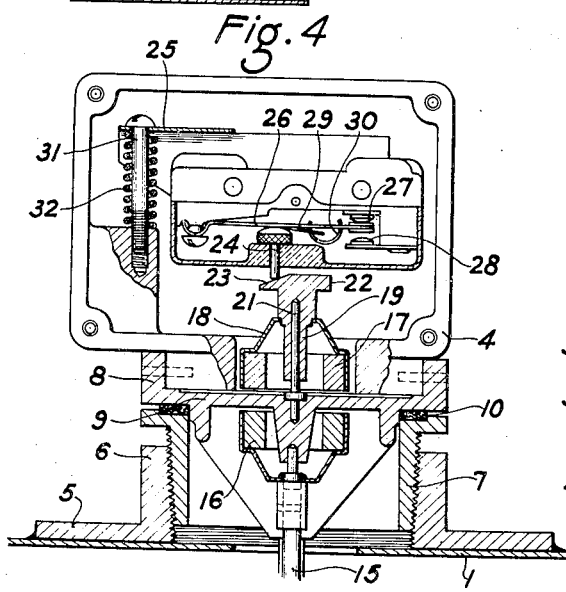
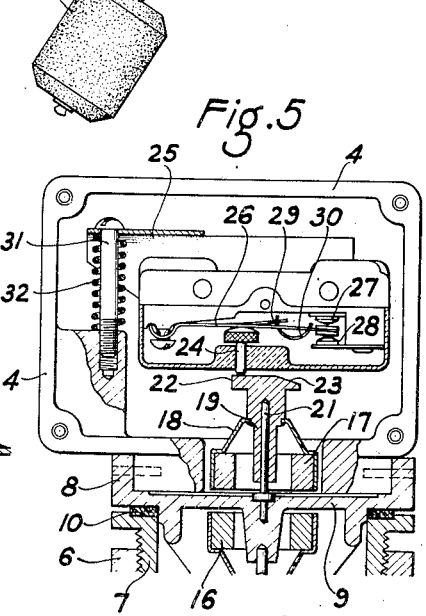
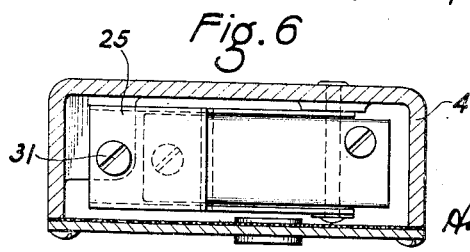
INVENTOR.
George E. Ford
BY Harold E. Stonebraker
ATTORNEY.

Patented July 4, 1944

2,352,830

UNITED STATES PATENT OFFICE 2,352,830

SIGNAL MECHANISM

George E. Ford, Rochester, N. Y., assignor to Rochester Manufacturing Co., Inc., Rochester, N. Y., a corporation of New York Application July 15, 1942, Serial No. 451,017

8 Claims. (Cl. 200—84)

This invention relates to a liquid level indicator, with more particular reference to a structure designed to give a signal when the level of liquid in a tank reaches a predetermined low point, and it has for its object to provide such a mechanism that can be used effectively in connection with gasoline or other liquid containers on combat tanks, trucks, or busses, which frequently have to travel over rough ground.

One object of the invention is to afford a structure that will accurately give a signal when the level of liquid in a tank reaches a certain low point, while precluding the possibility of a false signal due to the liquid sloshing about in the container as the vehicle travels over rough or uneven ground, and which will operate in any position on a tank or container.

Another purpose of the invention is to afford an arrangement in which the parts are designed so as to prevent vibration or movement of the mechanism except such as is due to the liquid reaching the level at which a signal is to be given and to maintain the controlling float submerged through a major part of the depth of liquid so as to prevent the float riding on the surface of the body of liquid and being thereby affected by the surging and waving of the liquid as the tank is moved over uneven ground.

An additional object of the invention is to afford a construction that cooperates efficiently with rotatable driving and driven ring magnets on opposite sides of a wall such as illustrated in Patent No. 2,241,983, May 13, 1941, thus enabling an electric signalling mechanism to be used for indicating the low level of a highly inflammable liquid while eliminating danger of a spark from the electric switch mechanism reaching the liquid in the tank.

Still a further purpose of the invention is to afford a mechanism that utilizes rotatable ring magnets such as referred to above in conjunction with a cam connected to the driven magnet for operating an electric switch control member, the arrangement being such that the switch and control member exert a constant pressure against the cam, thus assisting the action of the magnets in holding the parts against vibration and preventing a false signal that might otherwise result from movement of the liquid within the tank before the liquid reaches the predetermined low point.

In a ring magnet mechanism such as referred to, the magnets must be of sufficient weight to possess the necessary magnetic strength to give the required action, and where such a mechanism is employed on a moving vehicle, vibration or irregular movement of the magnets is possible, and it is a purpose of the invention to relate the driven magnet and cam to the control member and switch in such a way that the parts cooperate to hold the driven magnet and the cam against vibration or false movements, the spring means that governs the switch acting to maintain the control member against the cam and thereby to press the cam and driven magnet against the bearing on which they turn, thus supplementing the action of the driving magnet which exerts a constant pull on the driven magnet by its magnetic flux.

To these and other ends, the invention consists in the construction and arrangement of parts that will appear clearly from the following description when read in conjunction with the accompanying drawing, the novel features being pointed out in the claims following the specification.

In the drawing:

Fig. 1 is a sectional view of a liquid tank showing diagrammatically the application of a preferred embodiment of the invention, including the signal circuit;

Fig. 2 is an enlarged view in side elevation of the float mechanism and switch housing positioned on a tank;

Fig. 3 is a plan view of the same;

Fig. 4 is an enlarged vertical sectional view through the electric switch mechanism and the float operated magnet assembly, showing the control member and cam in circuit-closing position for giving the desired signal at the low liquid level point;

Fig. 5 is a similar view showing the cam and control member in circuit-opening position, which the parts normally occupy when the liquid in the tank is above the predetermined low level, and Fig. 6 is a horizontal sectional view through the switch housing.

Referring more particularly to the drawing in which like reference numerals refer to the same parts throughout the several views, I designates a tank of conventional form designed to receive a float mechanism such as disclosed in Patent No. 2,241,983, May 13, 1941, to which a preferred embodiment of the invention has been adapted for operating a signal 2 which may be of any desired form, either visual or audible, and included within a circuit containing a battery 3, and operated automatically by a switch within a switch housing 4 mounted at the top of the tank 1, as will be described presently.

The tank may be used to contain gasoline or other highly inflammable liquid on a truck, bus, combat tank, or other vehicle designed for movement over rough ground, the float and float rod being located near the bottom of the tank and submerged considerably below the level when full so as to give a signal only when the float is operated by the level of the liquid approaching a fixed low point as when the tank is nearly empty, and it will be understood that the signal 2 is located at a point remote from the tank 1, preferably on the instrument board immediately in front of the driver or pilot, so as to give him a warning somewhat before the time when the tank requires refilling.

The tank has fixedly secured to it a fitting 5 that includes a flange or neck 6 threaded interiorly to receive the adaptor flange 7, while 8 designates a body of non-magnetic metal that is secured to the adaptor flange 7 by suitable attaching bolts, the joint between these parts being sealed by a gasket 10. The body 8 includes a horizontal wall 9 that separates and seals the interior of the tank and its highly inflammable contents from the parts thereabove including the switch mechanism that operates the signal, and in this manner, any possibility of the liquid within the tank being ignited by a spark from the electric control mechanism is effectually overcome.

The float mechanism includes the float 11 and float rod 12 suitably pivoted on a stationary support extending downwardly from the body 8 and a gear segment 13 movable with the float rod to operate the pinion 14 at the lower end of the shaft 15, the latter being journalled in a bearing in the body 8 and having fixedly connected thereto at its upper end a ring magnet 16 in accordance with the disclosure of the magnetically operated float mechanism of the above mentioned patent.

The permanent magnet 16 which is rotated by movement of the float 11, constitutes the driving magnet and operates the driven magnet 17 that is journalled above the wall 9 or on the opposite side from the driving magnet 16, and the parts are so constructed that when the float reaches the predetermined low point in the tank, it effects such turning of the driving magnet 16 as to turn the driven magnet 17 sufficiently to close the signal circuit and give the desired alarm. This is effected by the following mechanism.

The driven magnet 17 is mounted in a carrier or annular cup 18 which is securely mounted on a hub 19, the latter being journalled for rotation on a pin or bearing 21 that is fixedly attached to the wall 9. At its outer end, the hub 19 is provided with a cam 22 that includes a cam or bevelled surface 23 extending partially around the cam, and operates to engage the lower end of a switch control member or pin 24 which normally rests on the horizontal or high part of the cam, as shown in Fig. 5 to hold the signal circuit open, and is permitted to move downwardly by the bevelled portion 23 of the cam when the float reaches the predetermined low point in the tank.

The electric switch is mounted within the housing 4 on a bracket 25 supported on a screw 31 and held thereagainst during assembly and adjustment by the spring 32 after which the bracket is soldered to the screw 31 to hold it securely in place. The electric switch may be of any conventional form, such for instance as that known commercially as the Acro Snap Switch manufactured by Acro Electric Company, Cleveland, Ohio, and which includes a controlling switch 26 operating between the contact points 27 and 28 and connected by a spring 29 with the spring leaf 30. The spring 29 and spring leaf 30 exert a constant tendency to move the switch to circuit-closing position as shown in Fig. 4, but this action is resisted by the cam 22 which when in the position shown in Fig. 5 holds the switch control member or pin 24 in its uppermost position against the pressure of the spring 29 and leaf 30.

Thus the spring means exerts a constant pressure on the switch control member 24 and through it on the cam 22 and hub 19 and exerts a definite tendency to hold the hub against the bearing 21 and to prevent any upward movement or vibration of the hub and magnet thereon. When the parts are in the normal position illustrated in Fig. 5, the driving magnet 16 exerts a constant pull on the driven magnet 17 toward the driving magnet, and owing to the weight of the magnets, excessive uneven movements of the vehicle would cause vibration and false movement of the signal mechanism were it not for the spring means of the switch mechanism that cooperates with the control member, cam, and hub, and thus assists the magnetic action in holding the driven magnet on its bearing and preventing any movement thereof other than rotation due to the action of the driving magnet and float mechanism.

When the float 11 reaches the predetermined low point in the tank, the driving magnet moving accordingly causes a corresponding movement of the driven magnet and turns the cam sufficiently to bring the bevelled portion 23 beneath the control member or pin 24 which is thereby permitted to drop under the action of the spring 29 and leaf 30 and release the switch 26 for movement to circuit-closing position, the parts remaining in this position until the switch is restored to circuit-opening position by filling the tank and elevating the float 11.

With this structure, the switch mechanism is entirely separated and sealed from the liquid within the tank by the wall 9 and gasket 10 while at the same time the driven magnet at all times moves accurately in accordance with the motion of the float and driving magnet. Inasmuch as the float is submerged near the bottom of the tank, it is not affected by ordinary movement of the liquid within the tank and is not lowered until the level of the liquid reaches the point at which the signal is to be given. Any sudden or uneven movements of a vehicle on which the tank is mounted or jars which would otherwise cause vibration or movement of the driven magnet and a possible false signal are effectually prevented by the pulling action between the magnets due to the magnetic flux which tends to hold the driven magnet in proper relation to the driving magnet and float coupled with the spring pressure exerted by the switch control member against the cam and hub upon which the driven magnet is mounted, thus holding the latter to its seat or bearing.

The structure is illustrated in vertical position in a tank with the switch mechanism at the top but it will be understood that the switch mechanism may be located in any position, either at the side or bottom of a tank or container, and similarly operated from the controlling float. It is also possible, if desired, to give an indication or signal at both the high and low liquid levels by employing a suitable double throw switch and controlling the circuits from high and low points of a suitably formed cam.

While the invention has been described with reference to the particular disclosure shown, it is not confined to these details or parts, and this application is intended to cover any modifications or departures that may come within the purposes of the improvement or the scope of the following claims.

I claim:

1. In a float-operated liquid level indicating mechanism including a rotary driving ring magnet and a rotary driven ring magnet supported on a vertical bearing, a spring-actuated signal snap-switch which when released is in circuit-closing position, a switch control member constantly engaging said switch and movable in a direction parallel to said bearing, the control member acting to hold the switch in circuit-opening position, and a cam fixedly connected to the driven magnet and engaging said control member to actuate the latter in a direction parallel to the rotary axis of the driven magnet, the control member being constantly engaged with said cam under the spring pressure of said switch and acting to exert pressure on the cam and thereby hold the driven ring magnet on said bearing.

2. In a float-operated liquid level indicating mechanism including a rotary driving ring magnet and a rotary driven ring magnet, a spring-actuated signal snap-switch which when released is in circuit-closing position, a switch control member constantly engaging said switch and movable to hold the switch in circuit-opening position, and a cam fixedly connected to the driven ring magnet and constantly in engagement with said switch control member, the cam acting to hold the switch in circuit-opening position or to release the switch for movement to circuit-closing position.

3. In a float-operated liquid level indicating mechanism including a rotary driving ring magnet and a rotary driven ring magnet supported on a vertical bearing, a spring-actuated signal snap-switch which when released is in circuit-closing position, a switch control member constantly engaging said switch and movable in a direction parallel to the rotary axis of the driven magnet to hold the switch in circuit-opening position, and a cam fixedly connected to the driven ring magnet and constantly in engagement with said switch control member, the cam acting to hold the switch in circuit-opening position and the control member acting to exert constant pressure on the cam.

4. In a float-operated liquid level indicating mechanism including a rotary driving ring magnet and a rotary driven ring magnet supported on a vertical bearing, a signal switch which is held in circuit-opening position and when released is in circuit-closing position, a switch control member constantly engaging said switch and movable in a direction parallel to the rotary axis of the driven magnet to hold the switch in circuit-opening position, spring means acting to move the switch toward circuit-closing position, and a cam fixedly connected to the driven ring magnet and having constant engagement with said control member, the spring means acting to hold the control member against the cam.

5. In a float-operated liquid level indicating mechanism including a rotary driving ring magnet and a rotary driven ring magnet, a spring-actuated signal switch which when released is in circuit-closing position, a switch control member constantly engaging said switch and movable in a direction parallel to the rotary axis of the driven ring magnet, and a cam fixedly connected to the driven ring magnet and having constant engagement with said control member, the latter being held against the cam by the spring-actuated switch and acting when released by the cam to free the switch for movement to circuit-closing position.

6. In a float-operated liquid level indicating mechanism including a rotary driving ring magnet and a rotary driven ring magnet, a carrier for the driven magnet, a hub to which the carrier is fixedly attached, a vertical bearing upon which said hub is rotatably supported, a cam surface at the outer end of said hub, a signal switch which when released is in circuit-closing position, a switch control member constantly engaging said switch and movable in a direction parallel to said bearing to hold the switch in circuit-opening position, and spring means acting to move the switch to circuit-closing position and to maintain the control member constantly engaged with said cam surface.

7. In a float-operated liquid level indicating mechanism including a rotary driving ring magnet and a rotary driven ring magnet, a carrier for the driven magnet, a cam fixedly connected to the carrier, a vertical bearing upon which the cam and carrier are rotatably supported, a signal switch, and a control member engaging said cam and switch and movable in a direction parallel to the rotary axis of the driven magnet.

8. In a float-operated liquid level indicating mechanism including a rotary driving ring magnet and a rotary driven ring magnet supported on a vertical bearing, a carrier for the driven magnet, a hub to which said carrier is fixedly attached, a vertical bearing upon which said hub is rotatably supported, a cam arranged on the hub, a signal switch, a control member engaging said cam and switch and movable in a direction parallel to the rotary axis of the driven magnet, and spring means acting to move the switch to circuit-closing position and to maintain the control member constantly in engagement with the cam, the control member when released by the cam permitting movement of the switch to circuit-closing position and acting constantly to hold the hub and magnet against said bearing.

GEORGE E. FORD.